USO09838396B2

United States Patent
Nainwal

(10) Patent No.: US 9,838,396 B2
(45) Date of Patent: Dec. 5, 2017

(54) CONTROLLING CONTENT-SHARING USING A PRIVACY LIST SNAPSHOT

(71) Applicant: Facebook, Inc., Menlo Park, CA (US)

(72) Inventor: Satyendra Kumar Nainwal, Menlo Park, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 14/594,042

(22) Filed: Jan. 9, 2015

(65) Prior Publication Data

US 2016/0205105 A1   Jul. 14, 2016

(51) Int. Cl.

| H04L 29/06 | (2006.01) |
|---|---|
| G06Q 50/00 | (2012.01) |
| G06F 21/10 | (2013.01) |
| H04W 4/20 | (2009.01) |
| H04W 12/02 | (2009.01) |

(52) U.S. Cl.
CPC ............ *H04L 63/101* (2013.01); *G06F 21/10* (2013.01); *G06Q 50/01* (2013.01); *H04W 4/206* (2013.01); *H04W 12/02* (2013.01)

(58) Field of Classification Search
CPC ................................. G06F 21/10; H04L 63/10
USPC .......................................................... 726/28
See application file for complete search history.

(56) References Cited

U.S. PATENT DOCUMENTS

| 8,185,558 | B1 * | 5/2012 | Narayanan | G06F 17/30958 707/798 |
|---|---|---|---|---|
| 8,402,094 | B2 * | 3/2013 | Bosworth | G06Q 30/08 705/319 |
| 8,612,586 | B2 * | 12/2013 | Faller | G06Q 10/10 709/200 |
| 8,713,055 | B2 * | 4/2014 | Callahan | G06F 21/604 705/319 |
| 9,177,347 | B2 * | 11/2015 | Jackson | G06Q 50/01 705/319 |
| 2009/0164574 | A1 * | 6/2009 | Hoffman | H04W 4/02 709/204 |
| 2010/0197318 | A1 * | 8/2010 | Petersen | G06Q 10/10 455/456.1 |
| 2013/0103758 | A1 * | 4/2013 | Alison | G06Q 50/01 709/204 |
| 2013/0124595 | A1 * | 5/2013 | Oplinger | H04L 12/00 709/201 |
| 2014/0089405 | A1 * | 3/2014 | Silbey | G06Q 10/101 709/204 |

(Continued)

*Primary Examiner* — Haresh N Patel
(74) *Attorney, Agent, or Firm* — Nicholson De Vos Webster & Elliott LLP

(57) ABSTRACT

Exemplary methods, apparatuses, and systems receive a request from a first user of a social networking system, during a first time period, to share a content item with a plurality of second users that are connected to the first user via a set relationship. A snapshot of the plurality of second users during the first period of time is created. During a second time period that is subsequent to the first time period, a request to view content items is received from a third user that became connected to the first user via the set relationship after the first time period. The content item shared during the first time period is excluded from content items shared with the third user in response to determining that the content item is associated with the PLS and that the third user is not in the PLS.

20 Claims, 10 Drawing Sheets

(56) References Cited

U.S. PATENT DOCUMENTS

| | | | |
|---|---|---|---|
| 2014/0173399 A1* | 6/2014 | Sorg | G06Q 50/01 |
| | | | 715/206 |
| 2014/0279069 A1* | 9/2014 | Rubinstein | G06Q 30/0277 |
| | | | 705/14.73 |
| 2015/0199669 A1* | 7/2015 | Ramirez | G06Q 20/22 |
| | | | 705/319 |

\* cited by examiner

CONTROLLING CONTENT-SHARING USING A PRIVACY LIST SNAPSHOT

FIELD

Embodiments described herein relate to managing content shared via a network service. Specifically, the embodiments relate to controlling privacy of content shared within a social networking system.

BACKGROUND

Social networking systems enable users to interact with various objects represented within the social network. For example, a social networking system allows users to designate other users or entities as connections (or otherwise connect to, or form relationships with, other users or entities), contribute and interact with their connections, post media or commentary, share links to external content, use applications, join groups, list and confirm attendance at events, invite connections, and perform other tasks that facilitate social interaction. External applications also use the services of a social networking system to allow authenticated users to incorporate some of the above social interactions with use of the external applications. Similar interactions may also be a part of the user experience within other network services.

Social networking systems provide controls for limiting how content is shared with other users. For example, users may control content-sharing based on the types of relationships between the users. For example, the system can limit sharing of content associated with a first user (such as text, audio, video, etc.) to only users that are connected to the first user within the social network. As time passes and the first user adds connections, the system makes the shared content available to the added connections.

SUMMARY OF THE DESCRIPTION

Exemplary methods, apparatuses, and systems provide a Privacy List Snapshot (PLS) for controlling content-sharing in a social networking system. In one embodiment, a PLS is created for a first user of a social networking system to add the dimension of time to controlling how content is shared. The PLS includes one or more second users of the social networking system that are connected to the first user via a set relationship during a first period of time. The one or more second users can, for example, be friends of the first user, followers of the first user, friends of friends of the first user, members of a group, entities followed by the first user, other entities with which the first user is connected, etc. Exemplary set relationships include direct or first-degree connections within the social networking system (e.g., "friends"), second-degree connections (e.g., "friends of friends"), user-created groups of connections, etc. Exemplary periods of time include periods defined by a user's attendance of a school, spent working for a company, an age range, etc. Content shared by the first user based upon the set relationship during the first period of time is, by default, limited to the users of the social networking system that are connected to the first user via the set relationship during that period of time. For example, if content is shared by a user during a period defined by when the user attended high school and the content was shared with users within a set relationship defined by first-degree connections/friends, the sharing of the content is limited to those connections that were friends with the first user when the content was shared (e.g., friends at the moment the content was shared, friends during the period of time defined by when the user attended high school, etc.) and not shared with others (e.g., first-degree connections made after the content is shared or after that period of time). In other words, when a later-made connection of the user requests to review content items shared by the user (e.g., attempts to browse a news feed, timeline, photo album, or other aggregation of content that may include content shared by the user), content items shared during a period of time prior to the relationship with the later-made connection are not shared with the later-made connection (e.g., omitted from the content presented to the later-made connection) as a result of the connection not being included in the set relationship (e.g., as defined by a PLS) when the content was shared or otherwise during that period of time (and despite the later-made connection being included in the set relationship after the content was shared/ that period of time). As a result, the later-made connection may be presented with content recently shared by the user but left unaware of or otherwise unable to access content shared earlier.

Other features and advantages are apparent from the accompanying drawings and detailed description.

BRIEF DESCRIPTION OF THE DRAWINGS

The present invention is illustrated using non-limiting examples in the figures of the accompanying drawings, in which like references indicate similar elements.

DETAILED DESCRIPTION

Users of a social networking system share content by posting electronic messages to the system. These electronic messages are commonly referred to as posts. For example, a user may publish text and/or media to the social networking system for other users to view. The social networking system limits which users are able to view and/or interact with another user's posts based on the user's privacy settings and/or the types of connections between users. Enabling users to control how content is shared encourages users to share content by decreasing the likelihood the shared content will be provided to unintended recipients. Sharing of content with unintended recipients still happens, however, even though the social networking system complies with privacy criteria set by users. For example, a user adds connections to other users over time but may not consider what content the user previously shared that will be accessible to the added connections. Content shared with friends during one period of life may not be ideal for sharing with friends during another period of life. A Privacy List Snapshot (PLS), as set forth by the embodiments described herein, limits content-sharing to those users that were connected to the user sharing the content within a period of time associated with the shared content. As a result, users of the social networking system are able to share content with fewer concerns that the shared content will be provided to unintended recipients.

In the following description, numerous specific details are set forth. However, it is understood that embodiments described herein may be practiced without these specific details. References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Additionally, as used herein, the term "exemplary" and its variations refer to embodiments that serve simply as an example or illustration. Furthermore, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
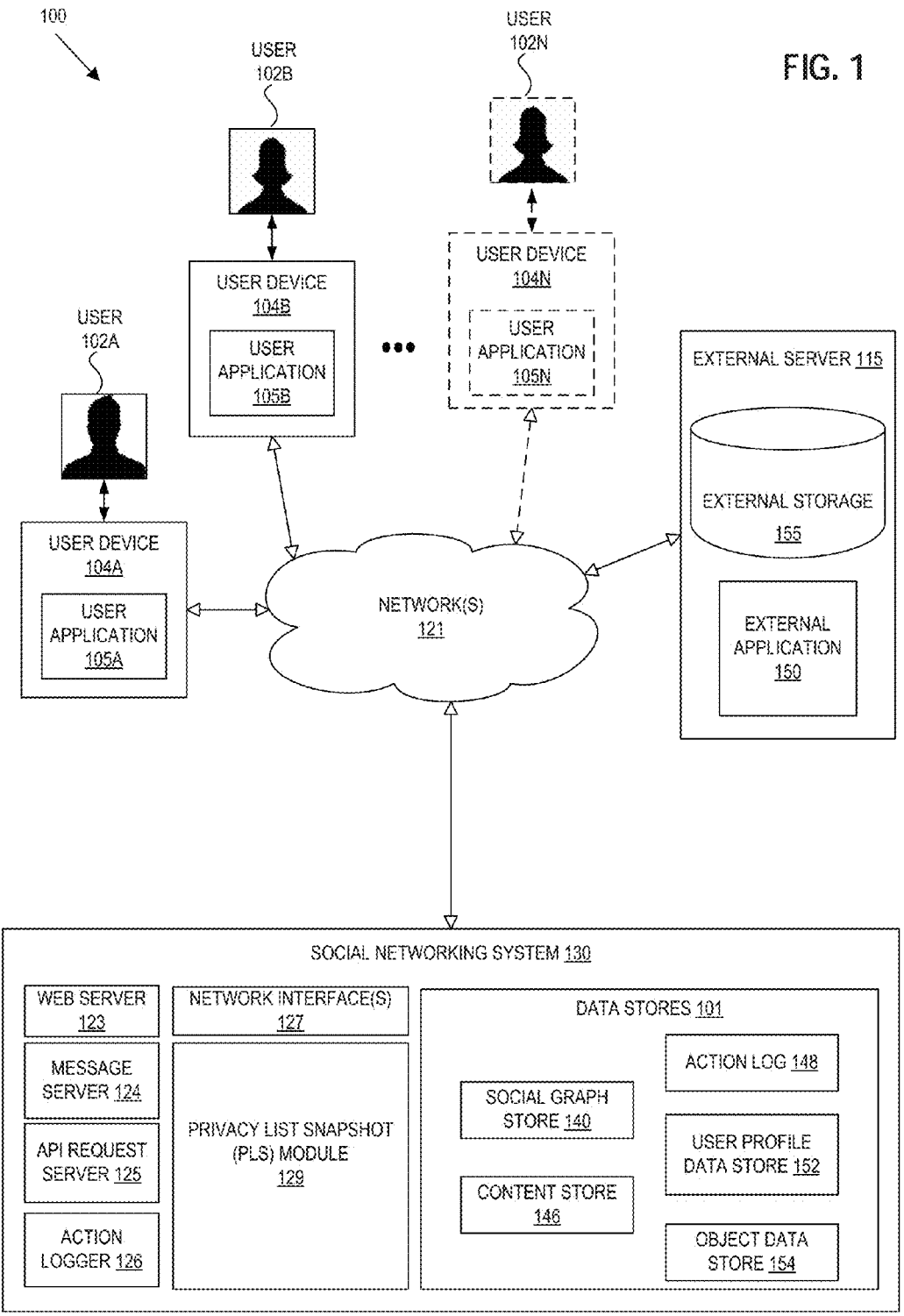
FIG. 1 illustrates a network environment of a system including a social networking system.

FIG. 1 illustrates an exemplary network environment of a system 100 including a social networking system 130 that offers users 102A-102N the ability to communicate and interact with other users 102A-102N and entities of the social networking system 130 according to an embodiment. The illustrated social networking system 130 includes a PLS module 129 for providing a PLS to control content-sharing in the social networking system 130.

The user devices 104A-104N can interact with social networking system 130 and can be any type of computer capable of receiving user input as well as transmitting and/or receiving data via a network (e.g., network(s) 121). Exemplary user devices 104A-104N include conventional computer systems, such as a desktop or laptop computer, or may include devices having computer functionalities such as Personal Digital Assistants (PDA), cellular or mobile telephones, smartphones, in- or out-of-car navigation systems, gaming devices, or other electronic devices.

In one embodiment, a user device (e.g. 104A) may execute a user application (e.g. 105A) allowing a user 102A of the user device 104A to interact with the social networking system 130. For example, the user application 105A may be a web browser application. In an embodiment, the user application 105A is a client application (e.g., Facebook™ for iPhone or iPad, etc.), and in an embodiment the user application 105A is the native operating system of the user device 104A, such as Windows®, Mac OSX®, iOS®, or ANDROID™, which may utilize an Application Programming Interface (API) to directly interface with the social networking system 130 through API request server 125.

The user devices 104A-104N can communicate with the social networking system 130 via a network 121 or collection of networks, such as the Internet, a corporate Intranet, a Virtual Private Network (VPN), a Local Area Network (LAN), a Wireless Local Area Network (WLAN), a cellular network, a Wide Area Network (WAN), a Metropolitan Area Network (MAN), or a combination of two or more such networks. The network 121 may be wired, wireless, or a combination of both. In one embodiment, the network 121 uses standard communications technologies and/or protocols.

In one embodiment, the social networking system 130 comprises one or more computing systems storing user profiles associated with users 102A-102N and/or other objects, as well as connections between users and other users 102A-102N and/or objects. Users 102A-102N, using the social networking system 130, may add connections to other users or objects of the social networking system 130 to which they desire to be connected, and may also interact with these other users or objects. The users of the social networking system 130 are individuals (e.g. humans), and the objects may include entities (such as businesses, organizations, universities, manufacturers, brands, celebrities, etc.), concepts, or other non-human things including but not limited to a location, an album, an article, a book, a concept, a movie, food, etc.

Based on the stored data about users, objects, and the connections between the users and/or objects, the social networking system 130 generates and maintains a social graph in a social graph store 140 comprising a plurality of nodes interconnected by a plurality of edges. Each node in the social graph represents a user or object that can act on another node and/or that can be acted on by another node. An edge between two nodes in the social graph represents a particular type of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 130 adds, removes, or otherwise modifies edges connecting the various nodes to reflect the interactions. An exemplary social graph is described with reference to FIG. 2.

To provide these functionalities, one embodiment of the social networking system 130 includes a web server 123, a message server 124, an API request server 125, an action logger 126, and a set of data stores 101. This embodiment also includes, within the data stores 101, a social graph store 140, a content store 146, an action log 148, a user profile data store 152, and an object data store 154. In one embodiment, the social networking system 130 may include additional, fewer, or different modules for various applications. Of course, conventional components such as processors, memories, security mechanisms, load balancers, failover servers, management and network operations consoles, and the like are not shown in FIG. 1 so as to not obscure the details of the system.

The social networking system 130 allows its users 102A-102N to engage in content-sharing by communicating or otherwise interacting with each other and accessing content, as described herein. The social networking system 130 stores user profiles in the user profile data store 152. A user profile includes declarative information about the user that was explicitly shared by the user, and may also include profile information inferred by the social networking system 130. In one embodiment, a user profile includes multiple data fields, each data field describing one or more attributes of the corresponding user of the social networking system 130. The user profile information stored in user profile data store 152 describes the users 102A-102N of the social networking system 130, including biographic, demographic, and other types of descriptive information, such as work experience, educational history, gender, relationship status, hobbies, location, other preferences, and the like. The user profile may also store information provided by the user. For example, images, videos, and location data provided by the user may also be stored within the user profile. In one embodiment, only textual data of the user is stored in the user profile and other data (e.g., images, videos, etc.) are stored in multimedia stores and associated with the user (e.g., through associating a user identifier of the user with an image/video identifier of the multimedia content). In one embodiment, images, videos, and posts by users including or depicting one or more other users of the social networking system 130 may be "tagged" with identification information of those users. A user profile in the user profile data store 152 may also maintain references to actions (stored in the user profile or in an action log 148) by the corresponding user performed on content items in a content store 146. A user may also specify one or more privacy settings, which are stored in that user's user profile. Privacy settings limit information that the social networking system 130 or other users of the social networking system 130 are permitted to access from that user's user profile. In one embodiment, the privacy settings limit access to information from a user's user profile based on a particular type of connection between the user and at least one of the other users of the social networking system 130.

The web server 123 links the social networking system 130 via the network 121 to one or more user devices 104A-104N by accepting requests from the user devices 104A-104N and/or transmitting webpages or other web-related content to the user devices 104A-104N, such as image files, audio files, video files, Java applets, Flash, XML, JavaScript, Cascading Style Sheets (CSS), and so forth. The web server 123, in one embodiment, is configured to utilize a set of one or more network interfaces 127 to send and receive messages across the network 121. In one embodiment, the web server 123 (additionally or alternately) utilizes a message server 124 (e.g., a dedicated server end station, a dedicated software application, etc.) to communicate with the user devices 104A-104N. The message server 124 is operative to send and/or receive instant messages, queued messages (e.g., email), text and SMS (Short Message Service) messages, or utilize any other suitable messaging technique.

In one embodiment, the social networking system 130 sends a message composed by a user to another user, which can be viewed by other users of the social networking system 130, e.g., by certain connections of the user (directly connected users in the social graph, other users more than one hop away in the social graph, etc.) receiving the message. An example of a type of message that can be viewed by other users of the social networking system 130 (besides the recipient of the message) is commonly known as a post. In one embodiment, a user can send a private message to another user that can only be retrieved by the other user. These messages are stored in storage such as message server 124.

When a user takes an action within the social networking system 130, an action logger 126, subject to any privacy settings and restrictions of the user and/or social networking system 130, may record the action in an action log 148. In one embodiment, the social networking system 130 maintains the action log 148 as a database of entries. When an action is taken on the social networking system 130, the social networking system 130 can add an entry for that action to the action log 148. According to one embodiment, the action logger 126 can receive communications from the web server 123 about user actions on and/or off the social networking system 130. The action logger 126 populates the action log 148 with information about those user actions. This information may be subject to privacy settings associated with the user. Any action that a particular user takes with respect to another user is associated with each user's profile, through information maintained in a database or other data repository, such as the action log 148. Examples of actions taken in the social networking system 130 that may be stored in the action log 148 include, but are not limited to, adding a connection to another other user, sending a message to the other user, reading a message from the other user, viewing content (e.g., posts, images, videos) associated with or created by the other user, attending an event posted by another user, being tagged in posts or photos with/by another user, etc. In one embodiment, certain actions are described in connection with more than one user, and these actions may be associated with those users as well and stored in the action log 148.

Users 102A-102N may interact with various objects on the social networking system 130, including commenting on posts via user devices 104A-104N, sharing content via user devices 104A-104N, accessing content items in a sequence via user devices 104A-104N, or other interactions. Information describing these actions is stored in the action log 148. Additional examples of interactions with objects on the social networking system 130 included in the action log 148 include logging in to the social networking system 130 using user devices 104A-104N, checking in to a location on the social networking system 130 using user devices 104A-104N, commenting on a photo album via user devices 104A-104N, communications between users' user devices 104A-104N, becoming a fan of a musician or brand by liking a page of the respective entity using user devices 104A-104N, adding an event to a calendar using user devices 104A-104N, joining a group using user devices 104A-104N, creating an event using user devices 104A-104N, authorizing an application using user devices 104A-104N, using an application using user devices 104A-104N, and engaging in a transaction using user devices 104A-104N. Additionally, the action log 148 records a user's interactions with advertisements on the social networking system 130 as well as other applications operating on the social networking system 130. In one embodiment, data from the action log 148 is used to infer interests or preferences of the user, augmenting the interests included in the user profile and allowing a more complete understanding of user preferences.

The action log 148 may be used by the social networking system 130 to track other user actions on the social networking system 130, as well as actions on an external application 150 (e.g., website) that are communicated to the social networking system 130. For example, the social networking system 130 may allow users to interact with external (e.g., third-party) applications 150 (e.g., websites), external storage 155, and/or external servers 115 (e.g., server end stations). The API request server 125 allows external systems (e.g., an external application 150 of external server 115, and/or user applications 105A of user devices 104A-104N) to access information from or transmit information to the social networking system 130 by issuing API calls. The information provided by the social networking system 130 may include user profile information or the connection information of users, subject to the individual privacy settings of the user. For example, a system (e.g. external application 150) may send an API request to the social networking system 130 via the network 121 to publish a story on behalf of a user, request information about a user (after having been given permission to do so by the user), upload a photograph on behalf of a user, etc. API requests are received at the social networking system 130 by the API request server 125, which then processes the request by performing actions sought by the API requests, determining appropriate responses to the API requests, and transmitting back these responses back to the requesting application 150 via the network 121.

The content store 146 stores content items associated with user profiles, such as images, videos, and/or audio files. Content items from the content store 146 may be displayed when a user profile is viewed or when other content associated with the user profile is viewed. For example, displayed content items may show images or video associated with a user profile or show text describing a user's status, commonly known as a status update. Additionally, other content items may facilitate user engagement by encouraging a user to expand his connections to other users or entities, to invite users to the system or to increase interaction with the social network system 130 by displaying content related to users, objects, activities, or functionalities of the social networking system 130. Examples of social networking content items include suggested connections or suggestions to perform other actions, media provided to or maintained by the social networking system 130 (e.g., pictures, videos), status updates, messages, or links posted by users to the social networking system, events, groups, pages (e.g., representing an organization or commercial entity), and any other content provided by, or accessible via, the social networking system 130. In one embodiment, content-sharing includes displaying at least one of a first user's user profile or one or more content items associated with the first user to a user device associated with a second user's user profile in response to the system 130 receiving a request from the user device associated with the second user's user profile to view the first user's user profile or to view the one or more content items associated with the first user.

The content store 146 also includes one or more pages associated with entities included social graph store 140. An entity is a type of object that can be a non-individual user of the social networking system 130, such as a business, a vendor, an organization, or a university. However, in one embodiment, an entity may represent a celebrity or other well-known individual, and thus an entity object node for a person may exist in the social graph (serving as a "brand" for that individual, and perhaps having an associated page that other users may "like") and also a user node for that same person may also exist in the social graph (serving as a representation for a personal account of that person). A page includes content associated with an entity and instructions for presenting the content to a user of the social networking system 130. For example, a page identifies content associated with the entity's stored content (from the object data store 154) and information describing how to present the content to users viewing the page. In one embodiment, content-sharing includes displaying at least one of an entity's user profile or one or more content items associated with the entity to a user device associated with a user's user profile in response to the system 130 receiving a request from the user device associated with the user's user profile to view the entity's user profile or to view the one or more content items associated with the entity.

In the depicted embodiment, the social networking system 130 includes a PLS module 129. The PLS module 129 creates a PLS and performs one or more functions for controlling content-sharing using a PLS as described in further detail herein. While embodiments described herein refer to method(s) of controlling content-sharing using a PLS performed by the PLS module 129 within the social networking system 130, all or part of the performance of method(s) (e.g., method 300) may be distributed across multiple components of social networking system 130 or may be performed by an external application 150 running on an external server 115.

Figure 2:
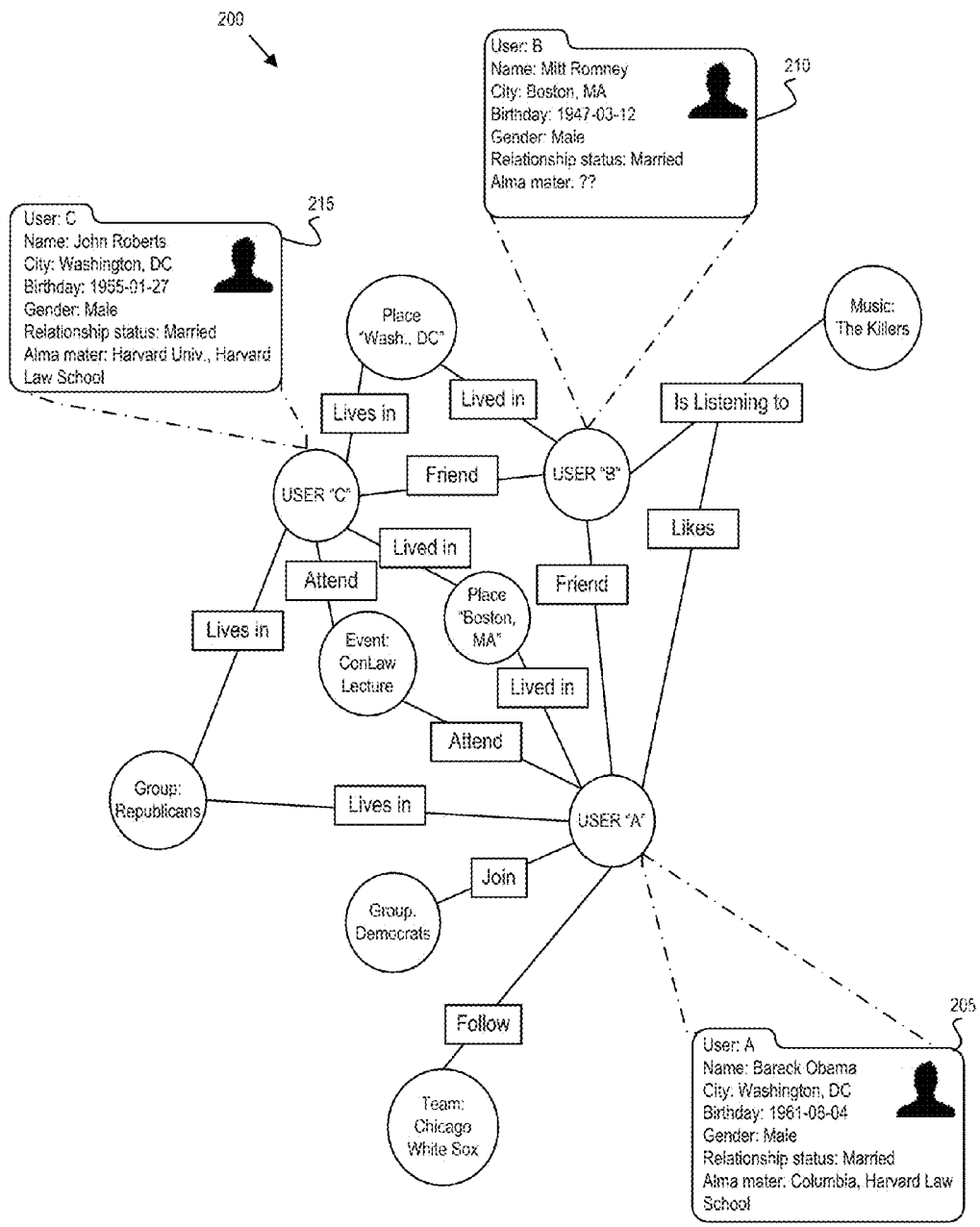
FIG. 2 illustrates a graph of social network data.

FIG. 2 illustrates an exemplary graph 200 of social network data. In graph 200, objects are illustrated as circles and actions are illustrated as labeled connections between circles. Developers of the social network or corresponding social network applications define actions to represent different ways that users may interact with the social network and/or their applications. As users perform actions, connections are made between users and objects. For example, User A has performed a number of actions within the social network, indicating that User A previously lived in Boston, currently lives in Washington D.C., joined groups for Democrats and ConLaw Lovers, checked in at Pi Pizzeria in St. Louis, Mo., and is friends with User B. User B and User C have also performed a number of actions with respect to objects within graph 200.

In one embodiment, users or entities, such as Users A-C, are able to add demographic information to user profiles 205-215. In one embodiment, for demographic information that has not been entered by a user, a social network application generates an estimate based upon the user's actions, connections, and/or actions of connections. For example, User B has not entered an alma mater into user profile 210. A social network application may determine from User B's contacts, activities, cities of residence, etc. that User B's likely alma mater is one or both of Brigham Young University and Harvard University. In one embodiment, the user profiles 205-210 include additional information, such as relationships to other users, places where the user has worked, user interests, etc.

In one embodiment, demographic data further includes a weight or score indicating an affinity between a user/entity and an object. For example, repeated user action with one object may indicate a stronger affinity for said object than another object with which the user has limited interaction. First degree connections, e.g., the friendship between User A and User B, may indicate a stronger affinity than second degree connections, e.g., User A is friends with User B, who is friends with User C, creating a second degree connection between User A and User C. For example, an indication that two users are married may indicate a stronger affinity than when two users are friends. Additionally, temporal and geographic proximity of actions/users are other exemplary indicators of affinity.

In one embodiment, users are able to provide feedback on actions of other users/entities. As a result, actions are also objects that may be acted upon. For example, User B listened to music by the artist, The Killers. Consequently, the social networking system can publish a narrative associated with User B (e.g., in a newsfeed, profile of User B, etc.) indicating that User B listened to The Killers. In viewing a newsfeed, profile of User B, or another form of social networking system publication(s), the social networking system displays the narrative, known as a post, to Users A, User B, and/or User C. The social networking system then receives input from User A indicating that User A "likes" that User B listened to The Killers.

In one embodiment, users may select privacy settings to control what network service data is shared, with whom the data is shared, and/or what data is used for selecting candidate objects. For example, a privacy setting of User A limiting the sharing of content to first degree connections prevents User C, a second degree connection, from viewing posts created by User A. In one embodiment, the PLS module 129 utilizes graph 200 to select users to be included within a PLS.

Figure 3:
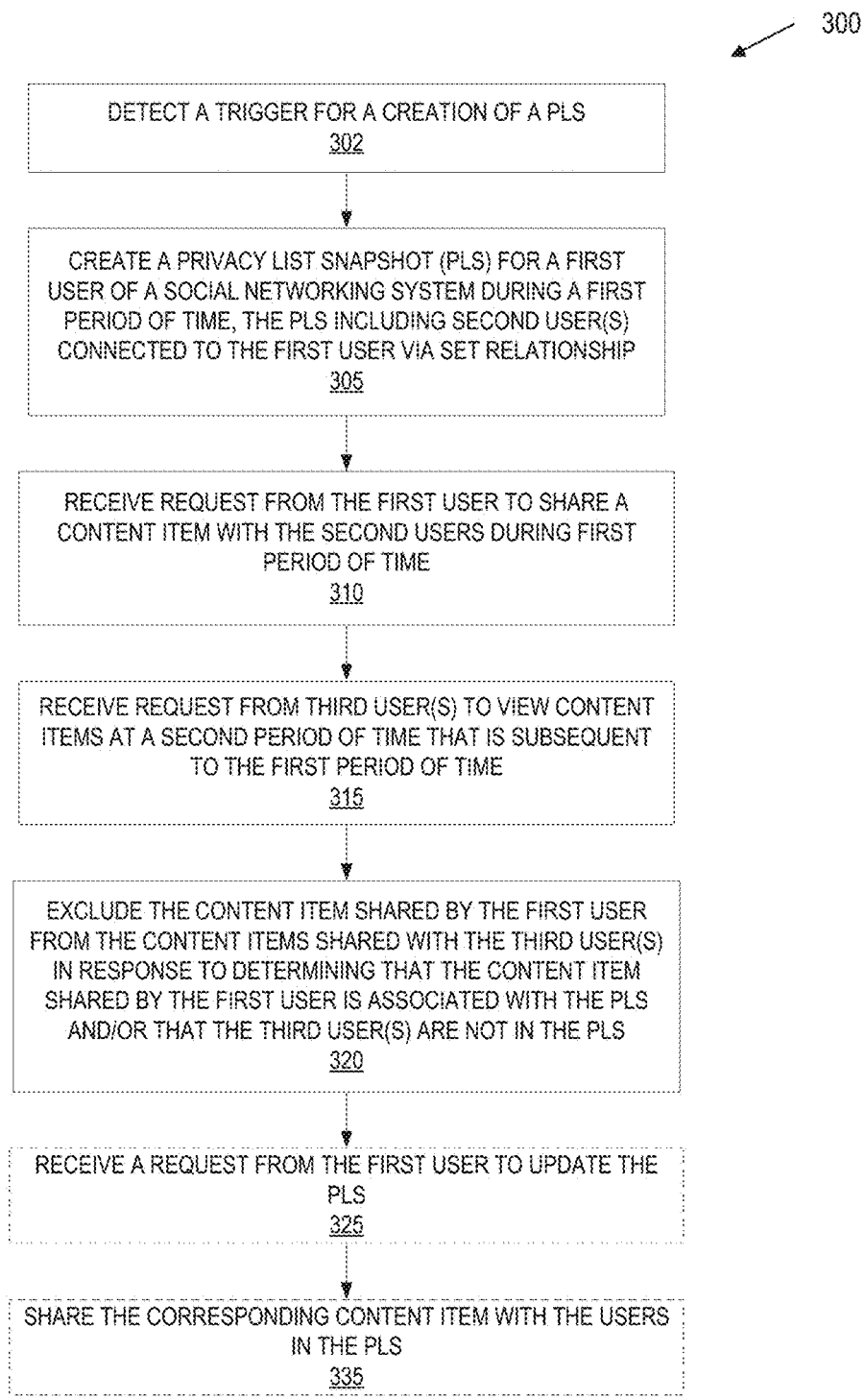
FIG. 3 illustrates, in flow chart form, a method of controlling content-sharing using a Privacy List Snapshot (PLS)

FIG. 3 illustrates, in flow chart form, a method 300 of controlling content-sharing using a Privacy List Snapshot (PLS). Method 300 is described with reference to a social networking system, such as social network system 130 described above in FIG. 1. Method 300, however, may also be performed by or in conjunction with a user device, an external server, or another computer.

At block 302, the social networking system (e.g., PLS module 129) detects a trigger for the creation of a PLS. For example, one or more of several events may trigger a creation of a PLS by the social networking system. In one embodiment, the social networking system creates the PLS automatically in response to the detected trigger and without user input requesting the creation of a PLS. In another embodiment, the social networking system creates the PLS in response to one or more user inputs directing the social networking system to create a PLS. In one embodiment, each PLS is stored by the social networking system, e.g., in data stores 101.

In one embodiment, the social networking system creates a PLS in response to receiving one or more user inputs from a user of the system. For example, the social networking system receives one or more user inputs selecting one or more graphical user interface elements to direct the system to create the PLS. In one embodiment, the social networking system provides a prompt or other user interface element during the creation of a particular post to enable user input that would direct the system to create a PLS at that particular moment.

In one embodiment, a social networking system creates a PLS in response to the expiration of a threshold period of time. For example, the social networking system may create a PLS on a repetitive basis as each of one or more threshold periods of time expires. In one embodiment, the threshold period is set based on one or more user inputs received by the social networking system. For example, user input may indicate an age of the user and the social networking system may set the threshold period of time to expire at a particular age. Additionally, the social networking system may set the threshold period of time to expire at an estimated date corresponding with the completion of a grade-level, attendance at a school, or another life event determined from user input to serve to demarcate a period of time with an estimated ending. In one embodiment, the social networking system automatically sets the threshold period based on an occurrence of certain events within the system. For example, the social networking may automatically set the threshold period of time to expire on the anniversary date of a user joining the social networking system.

In one embodiment, a social networking system creates a PLS in response to the social networking system detecting a change in a user profile associated with a first user (e.g., for the period of time leading up to and ended by the detected change). In one embodiment, the PLS is created in response to a threshold change in the declarative information explicitly shared by the first user with the social networking system. In one embodiment, a change within a single category of user information serves to trigger the creation of a PLS. For example, user input to update profile information regarding a school attended by the user, a location where the user lives, a job held by the user, a designation of another person as a significant other/spouse, etc. may serve to trigger the creation of a PLS. Alternatively, a cumulative set of changes to user information serves to trigger the creation of a PLS. For example, if the information changes by more than 50%, then the social networking system creates a PLS.

In one embodiment, the PLS is created in response to a change in profile information inferred by the social networking system. For example, the social networking system may infer that the user has moved, started at a new job, or begun another life event from changes to the user's connections, location data, and/or post content. As a further example, the social networking system may infer a user has started at a university based upon the addition of connections to other users attending the university, location data indicating the user being present at the university, and/or post content regarding classes or events at the university.

In one embodiment, the social networking system creates a PLS in response to the social networking system determining that a change in a number of connections associated with a first user exceeds a threshold change amount. For example, if the number of users that are connected to the first user via first degree connections increases or decreases by a threshold change amount, the social networking system creates a PLS or prompts the first user to create a PLS based on the change.

At block 305, the social networking system creates a PLS for a first user of the system during a first period of time. As described above, the period of time can be any period of time that corresponds to a portion of schooling (e.g., while the user is in high school or college), significant events (e.g., the start of a new job), age ranges, or another unit of time. In one embodiment, the PLS is a list or other data structure including one or more second users of the social networking system that are connected to the first user via a set relationship during the first period of time. In one embodiment, the set relationship is based on a type of connection between the first user and the second user(s). Types of connections include, but are not limited to, friends, followers, members of a group, entities followed by the first user, and other entities with which the first user is connected. The social networking system maintains user connections and types in a data structure, such as a social graph. For example, a set relationship between the first user and the one or more second users may refer to those users of the social networking system that have first degree connections with the first user. First degree connections may be referred to as friends, followers, and connections. In a further embodiment, the set relationship is further refined based on information about connections. The information may be explicitly shared and found in user profiles or inferred by the social networking system. For example, a PLS may be further refined based on whether the friends of the first user went to the same high school as the first user. In one embodiment, the created PLS is stored by the social networking system, e.g., in data stores 101.

At block 310, the social networking system receives a request from the user device associated with the first user (e.g., the user logged into the social networking system via the user device) to share a content item during the first period of time with the second user(s) that are connected to the first user via the set relationship. For example, the request may include text, a photo, a video, and/or other content to be posted to the social networking system and a privacy setting selection for the post. In one embodiment, the privacy setting is a default privacy setting provided by the social networking system. For example, the request may be to share content via a privacy setting corresponding to only friends (i.e., first degree connections), friends and friends of friends (i.e., first and second degree connections), publicly (i.e., anyone accessing the social networking system), etc. In another embodiment, the privacy setting is modified version of a default privacy setting. For example, the request may be to share the content with friends and one or more other users selected individually or as a part of a group. As another example, the request may be to share the content with friends but excluding one or more other users selected individually or as a part of a group. In yet another embodiment, the privacy setting includes a representation of the PLS or of the second user(s) that make up the PLS. For example, the request may indicate that the first user is sharing the posted content with "friends" or another set of connections that were connected to the first user via a set relationship during a period of time associated with a PLS. As a further example, the request may be to share the content with a PLS representing friends (or first degree connections) when the first user was in high school. As another example, the request may be to share the content with the combination of one or more PLS's and/or a group defined by a default privacy setting or modified version of a default privacy setting. In yet another example, the modified version of a default privacy setting may be modified to include or exclude users within a PLS. Based upon the received privacy setting, the social networking system associates the post with the PLS or other group of users defined by the privacy setting to manage sharing of the post content.

In one embodiment, the social networking system receives the request to share the content item prior to the creation of the PLS. For example, the request may include a privacy setting indicating that the post is to be shared with "friends." When a PLS for "friends" is subsequently created for the first period of time in which the social networking system received the request to share the content item, the PLS is associated with the content item.

At block 315, the social networking system receives a request from a user device associated with a third user to view content items associated with the first user at a second period of time that temporally occurs after the first period of time. In one embodiment, the third user is not connected to the first user via the set relationship. For example, the social networking system receives a request from a user device associated with a third user to view posts associated with the first user. In one embodiment, the request is a refresh of the third user's news feed or a similar request to view content items shared by or otherwise associated with a plurality of users of the system, including the first user. Alternatively, the third user's request is to specifically view content items shared by the first user.

In one embodiment, the third user is not connected to the first user via the set relationship that defines the PLS. In another embodiment, the third user became connected to the first user via the set relationship after the first period of time. For example, the social networking system identifies a third user as being added as one of a first user's friends after a time period defined by the PLS.

At block 320, the social networking system excludes the content item shared by the first user from the content items shared with the third user in response to determining that the first user's shared content item is associated with the PLS and that the third user is not included in the PLS. For example, the third user is able to view content items shared by the first user subsequent to the first user and third user becoming connected as friends within the social network. Additionally, or alternatively, the third user is able to view content items shared by other users according to the corresponding privacy settings for those content items. The content item shared by the first user and associated with the PLS, however, is not presented to the third user.

In one embodiment, the content item is excluded from content items shared with the third user despite the first user sharing the content item based upon a set relationship to which the third user was subsequently added. Continuing the example above, despite the content item being shared with friends of the first user and the first and third users being connected as friends, the content item is excluded as a result of the first and third users becoming connected as friends subsequent to the period of time defined by the PLS associated with the content item.

In one embodiment, the social networking determines that the third user is not included in the PLS based upon a comparison of the third user's username/profile with usernames/profile(s) in the PLS. In another embodiment, the social networking determines that the third user is not included in the PLS based upon the set relationship and time period defined by the PLS. For example, the social networking system determines that the third user is not connected to the first user via the set relationship or was not connected to the first user via the set relationship during the defined period of time.

At block 325, the social networking system optionally receives user input(s) to update the PLS. For example, the social networking system may present, via a user interface on a user device, to enable the user to add or remove users from the PLS. FIGS. 6A-D, described below, provide additional details about updating a PLS. In one embodiment, the social networking system receives user input(s) to update the PLS prior to receiving a request to share content. For example, the user may edit a PLS upon creation of the PLS.

At block 335, the social networking system enables users within the updated PLS to view the corresponding content item. For example, if the update to the PLS includes a request to add one or more third users to the PLS, the newly added third user(s) will be able to view and/or interact with the previously excluded content item.

In one embodiment, and in response to the social networking system excluding the first user's shared content item, the social networking system presents a user interface to a user device associated with the first user to prompt the user to grant the third user with access to view and/or interact with the excluded content item. For example, the social networking system may determine from a relationship type between the first user and the third user, connections between the third user and the second user(s) in the PLS, and/or other data stored in the social graph that indicates the first user is likely to grant the third user access to the item.

Figure 4:
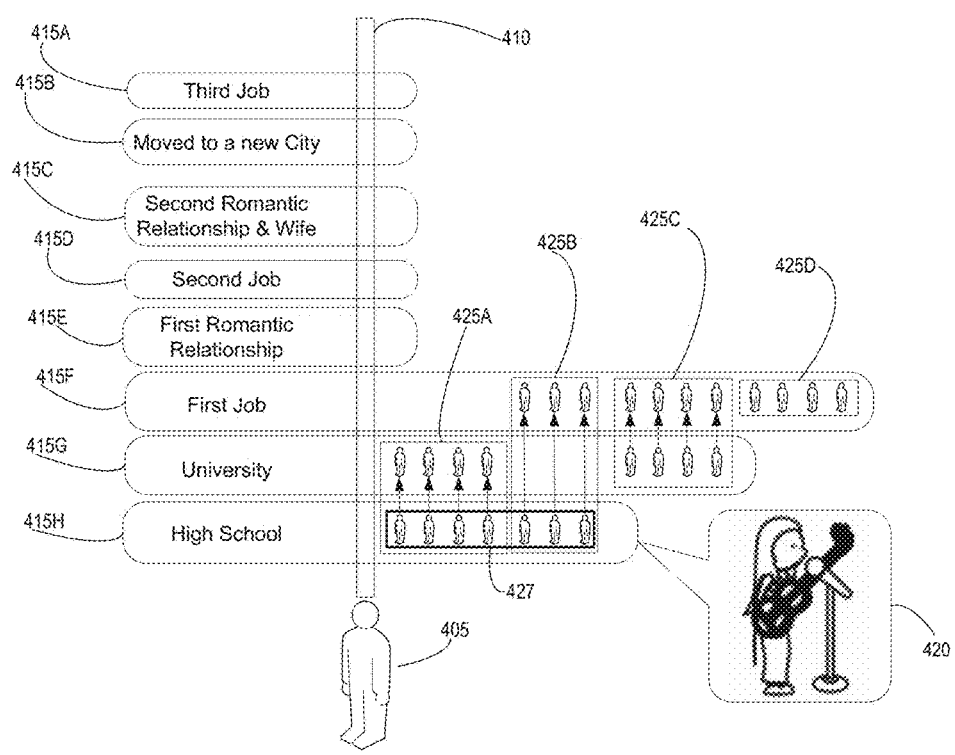
FIG. 4 illustrates an example of controlling the sharing of content using a PLS.

FIG. 4 illustrates one embodiment of a PLS 427 being used by a social networking system to control the sharing of one or more content items 420 associated with a first user 405. In one embodiment, the social networking system accounts for time period 410 and subsets of time within time period 410. For example, user 405 joined the social networking system before time period 415H associated with high school and remained a user of the system through a time period 415A associated with his third job. In an embodiment, the social networking system detects certain temporal points in a user's life as described above. The social networking system utilizes these temporal points to demarcate subsets of time within time period 410. For example, as the social networking system receives input regarding or otherwise detects changes in the user's life, those changes are also reflected in a user profile or otherwise associated with user 405 (e.g., within the social graph). The social networking system utilizes these changes to define time periods 415A-H.

As user 505 moves from high school (time period 415H) to university (time period 415G), user 505 makes connections and/or updates connection types with other users of the social networking system to reflect changes in his real-life social circle. For example, user 405 is connected to users 425A during time periods 415H and 415G but not during time period 415F and thereafter. User 405 remained connected to users 425B, in contrast, during time period 415F. Additionally, user 405 added new connections to users 425C during time period 415G and connections to users 425D during time period 415F.

In one embodiment, the social networking system maintains a representation of connections and connection types for user 405 during time periods 415A-H. For example, the social networking system maintains a representation of user 405 being connected to users 425A-B during time period 415H, when user 405 is in high school. In one embodiment, maintaining the representation of connections and connection types includes the social networking system creating a PLS. For example, the social networking system creates a PLS 427 for user 405 including those users that are connected to user 405 during time period 415H, i.e., users 425A-B. In one embodiment, the social networking system creates PLS 427 for user 405 as described above with reference to FIG. 3.

In one embodiment, the social networking system shares a post 420 on behalf of user 405 with the users 425A-B, as defined by a privacy setting/set relationship, during time period 415H. The social networking system associates post 420 with the PLS 427, which is comprised of users 425A-B. In one embodiment, the social networking system receives a request from one of users 425C during time period 415G to view content items associated with user 405. The social networking system shares content items of user 405 with the user 425C (e.g., shared during time period 415G), but excludes post 420 from the content shared with user 425C. As described above, the social networking system does not share post 420 with user 425C in response to the social networking system determining that post 420 is associated with the PLS 427 and that user 425C is not in the PLS 427. Similarly, the social networking system excludes post 420 from content items shared with one or more users 425D. In this way, the social networking system is able to control which users of the social networking system are granted access to view and/or interact with content items associated with user 405 as connections between users of the social networking evolve or change over time.

Figure 5:
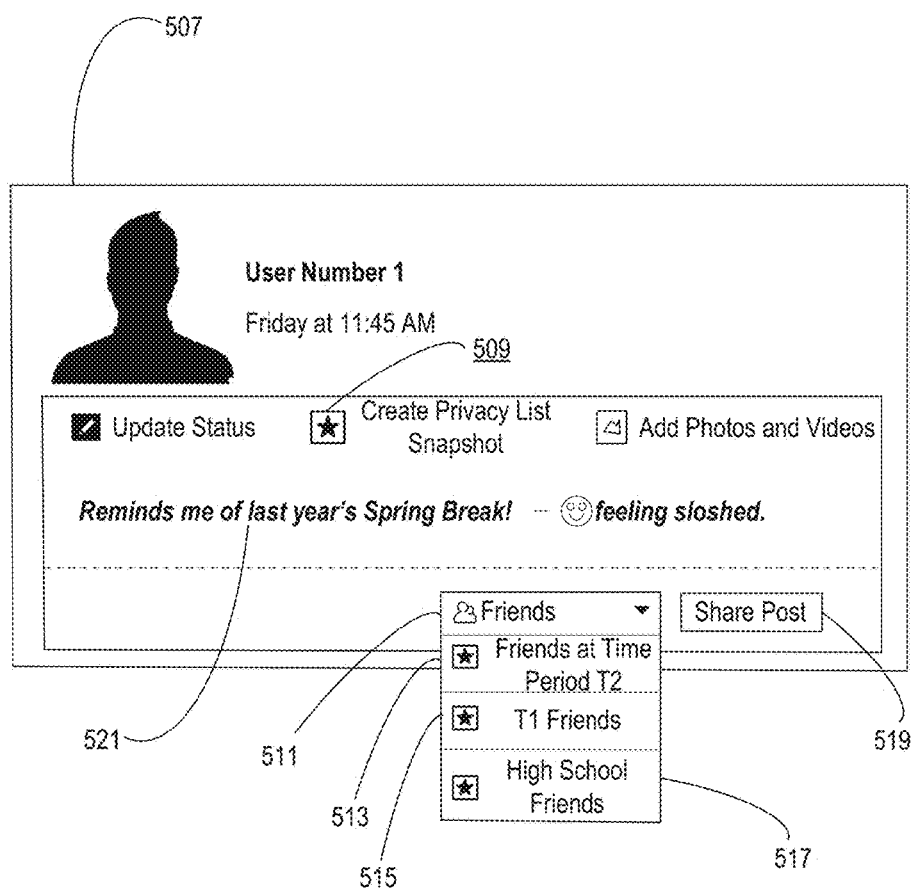
FIG. 5 illustrates an exemplary graphical user interface to create or receive selection of a PLS to be associated with content to be shared.

FIG. 5 illustrates, with an exemplary graphical user interface (GUI) 507, a social networking system receiving input to create or select a PLS to control the sharing of one or more content items 521 associated with a first user of the system, User Number 1.

In one embodiment, GUI 507 includes a selectable GUI element 509 that is used as an input to trigger the creation of a PLS by the social networking system. For example, in response to receiving the selection of GUI element 509, the social networking system creates a PLS including the one or more other users connected to User Number 1 via a set relationship (e.g., friends or first degree connections) at the time the social networking system receives the selection of GUI element 509. In one embodiment, in response to receiving the selection of GUI element 509, the social networking system enables the user to select a predefined set relationship (e.g., friends) or individual users to be included in the PLS (e.g., as described with reference to FIGS. 6A-D).

In one embodiment, GUI 507 includes a selectable GUI element 511 that can be used as an input to select a PLS or a plurality of users otherwise defined by a set relationship.

For example, in response to receiving a selection of GUI element 511, the social networking system presents a drop down menu including the set relationship, "Friends," and multiple PLS s, represented by GUI elements 513, 515, and 517. As described herein, each PLS includes a group of other users of the social networking system that are connected to User Number 1 via a set relationship during a corresponding period of time. As a first example, GUI element 513 represents a PLS including all of the users connected to User Number 1 during time period T2. In response to receiving a selection of GUI element 513, the social networking system limits the sharing of the post including content item 521 to only the users connected to User Number 1 during time period T2. In other words, the post is excluded from other users, such as users that subsequently become connected to User Number 1 after time period T2. As a second example, GUI element 515 represents a PLS including users connected to User Number 1 during time period T1. For the sake of brevity, this group is referred to herein as "T1 Friends." In this second example, selection of GUI element 515 results in only the T1 Friends being able to view and/or interact with the post having content item 521. As a third example, GUI element 517 represents a PLS including users that were connected to User Number 1 during the time period in which User Number 1 went to high school.

GUI 507 further includes a selectable GUI element 519 that can be used by the system as an input to trigger the sharing of one or more content items 521 with, for example, users included within the PLS created or selected by User Number 1.

Figure 6A:
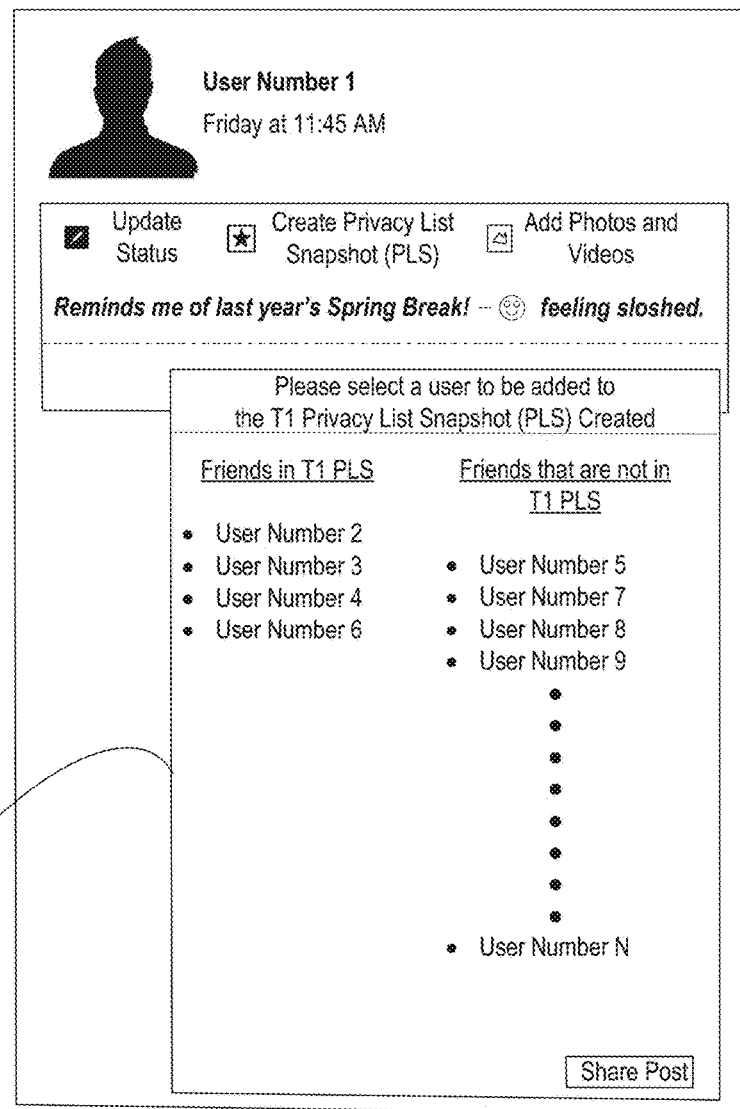
FIGS. 6A-D illustrate, with an exemplary graphical user interface, a manner of updating a PLS by adding a user to the PLS or removing a user from the PLS.

FIGS. 6A-D illustrate, with an exemplary GUI 600, a manner of updating an embodiment of a PLS by adding or removing a user from the PLS. FIG. 6A illustrates GUI 600 after the social networking system receives an input to update a PLS. For example, the social networking system presents GUI element 603 in response to receiving a selection of a GUI element (not shown). In one embodiment, a GUI element enabling the editing of a PLS is presented during the creation of a post, e.g., within or adjacent to GUI elements 513, 515, and 517. In another embodiment, a GUI element enabling the editing of a PLS is presented in published post, a settings page, or another drop down menu.

GUI element 603 includes an exemplary first list of users of the system that are in the selected PLS and an exemplary second list of users that are not in the selected PLS but that are otherwise connected to User Number 1. In one embodiment, the second list of users is based on the type of connection between the users in the first list and User Number 1. For example, the second list may represent users connected to User Number 1 based upon the same set relationship as the first list of users but connected to User Number 1 outside of time period T1.

Figure 6B:
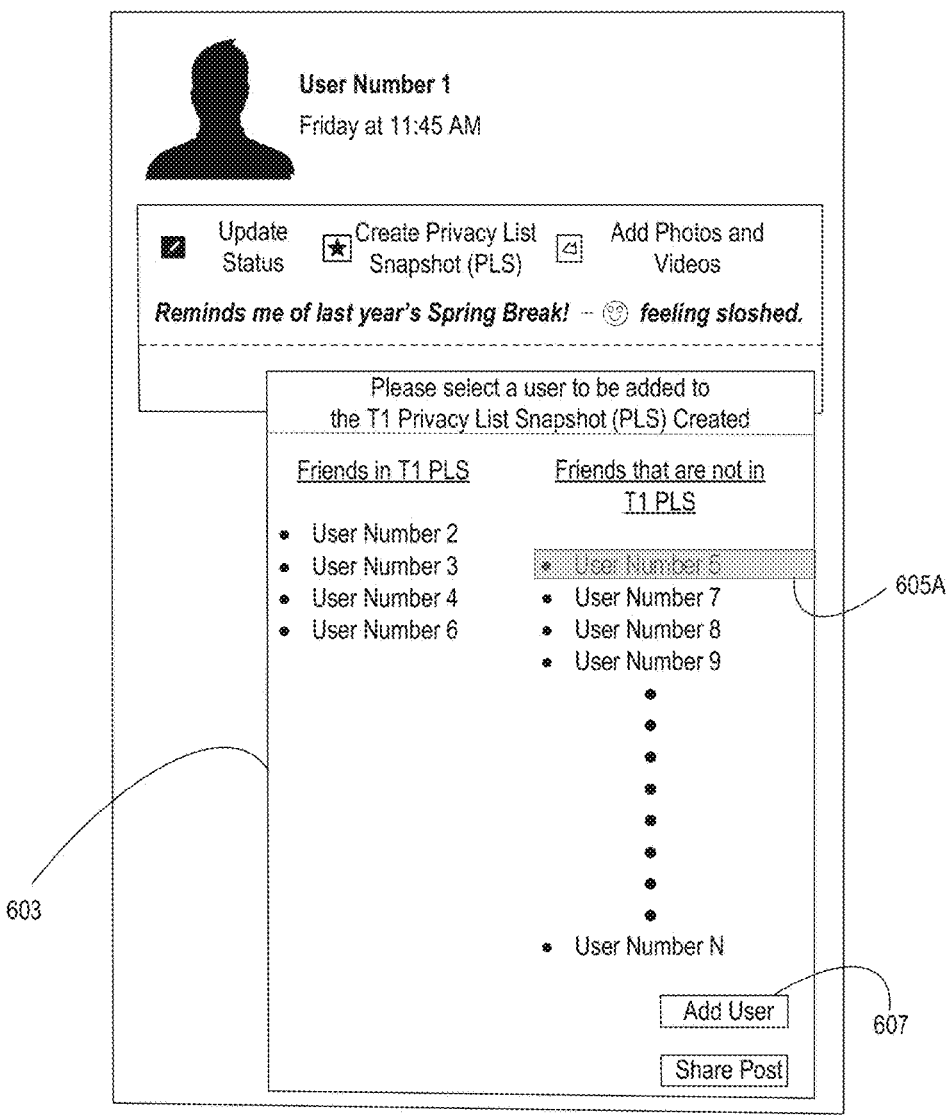
Figure 6C:
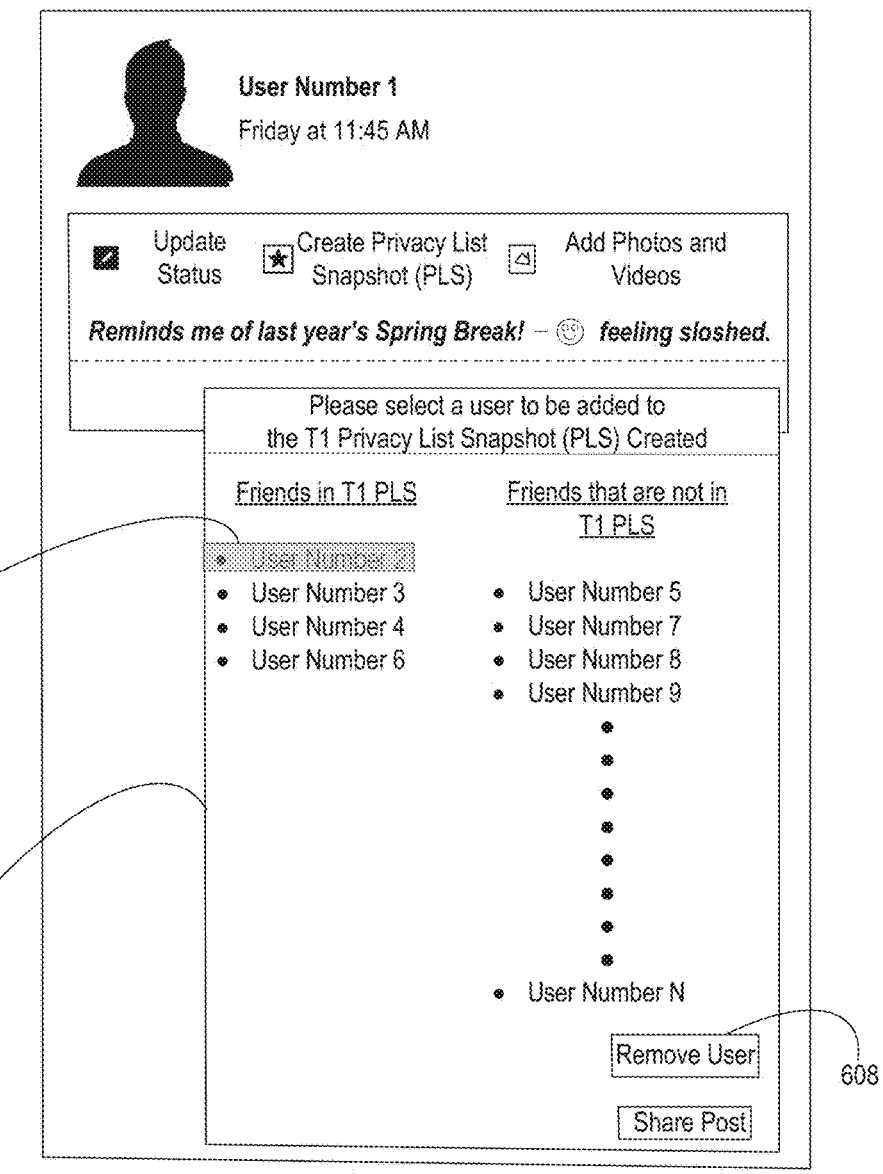

FIGS. 6B-C illustrate, respectively, GUI 600 following the social networking system receiving a selection of a user to be added to the selected PLS or removed from the selected PLS. As shown in FIG. 6B, the social networking system receives a selection 605A of User Number 5 to be added to the selected PLS. In one embodiment, in response to selection 605A, the social networking system presents GUI element 607 to confirm the addition of User Number 5. As shown in FIG. 6C, the social networking system receives a selection 605B of User Number 2 to be removed from the selected PLS. In one embodiment, in response to selection 605B, the social networking system presents GUI element 608 to confirm the removal of User Number 2. Only one user has been selected in each of the illustrated examples. In one embodiment, however, more than one user can be selected.

Figure 6D:
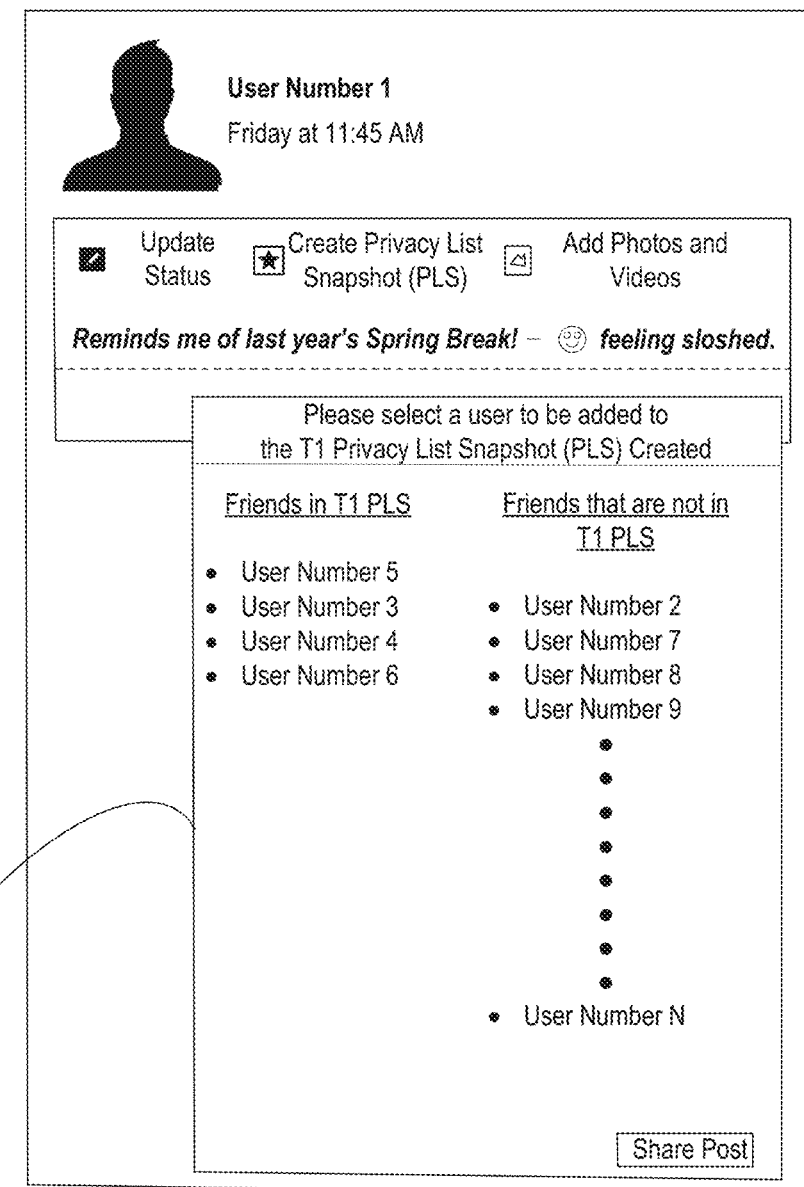

FIG. 6D illustrates GUI 600 following the addition and removal of the selected users described above. For example, selected User Number 5 is added to the PLS represented by the first list within GUI element 603. Additionally, selected User Number 2 is removed from the PLS.

Figure 7:
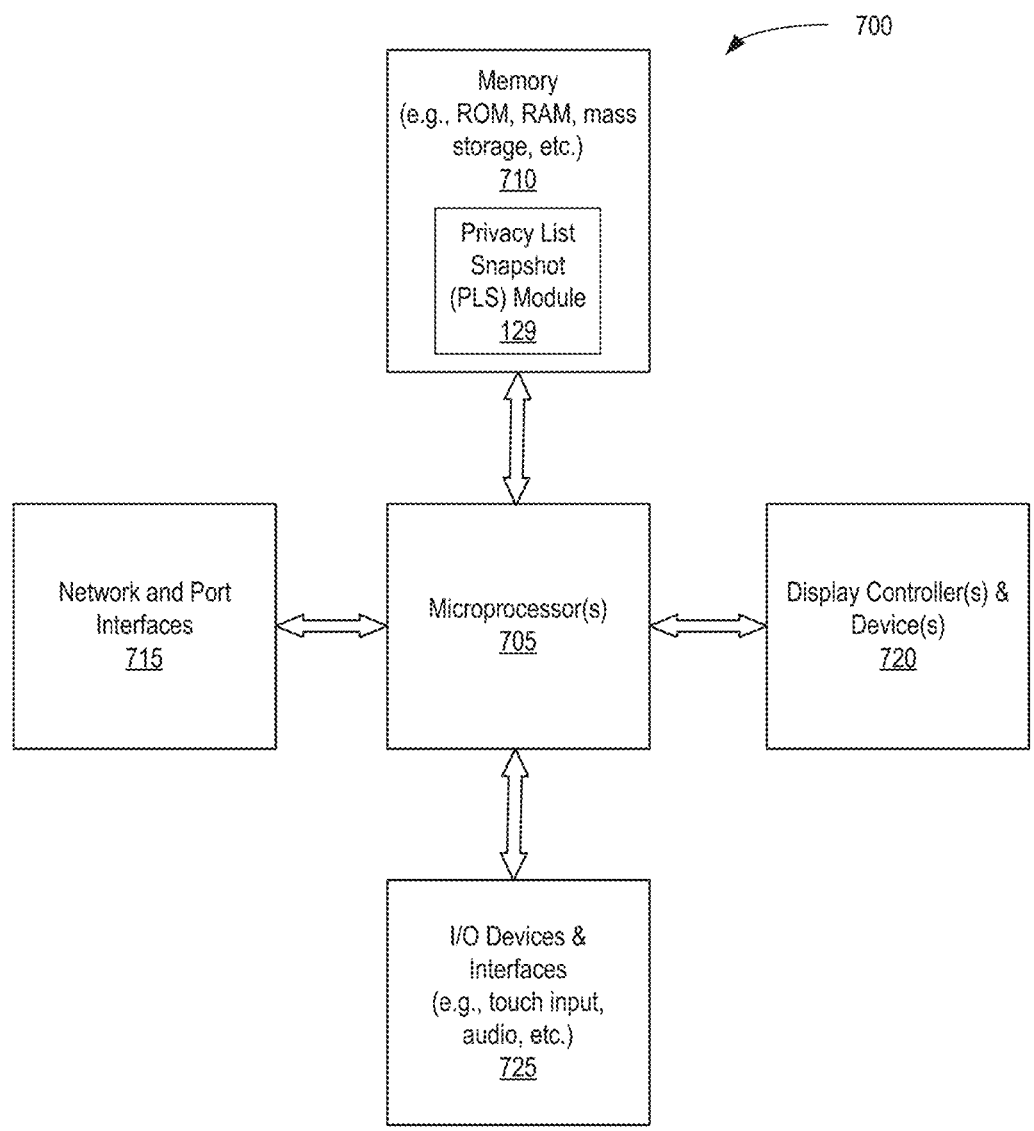
FIG. 7 illustrates, in block diagram form, an exemplary processing system to perform a process of controlling content-sharing using a PLS.

FIG. 7 illustrates, in block diagram form, exemplary processing system 700 to perform a method of using a PLS for controlling content-sharing in a social networking system, as described herein. For example, the processing system 700 is used to perform at least one of the processes described above with reference to FIG. 3, 4, 5, or 6A-6D. Data processing system 700 includes one or more microprocessors 705 and connected system components (e.g., multiple connected chips). Alternatively, data processing system 700 is a system on a chip.

Data processing system 700 includes memory 710, which is coupled to microprocessor(s) 705. Memory 710 may be used for storing data, metadata, and programs for execution by the microprocessor(s) 705. Memory 710 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 710 may be internal or distributed memory.

Data processing system 700 includes network and port interfaces 715, such as a port, connector for a dock, or a connector for a USB interface, FireWire, Thunderbolt, Ethernet, Fibre Channel, etc. to connect the system 700 with another device, external component, or a network. Exemplary network and port interfaces 715 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 700 with another device, external component, or a network and receive stored instructions, data, tokens, etc.

Data processing system 700 also includes display controller and electronic visual display 720 and one or more input or output ("I/O") devices and interfaces 725. Display controller and electronic visual display 720 provides a visual user interface for the user. I/O devices 725 allow a user to provide input to, receive output from, and otherwise transfer data to and from the system. I/O devices 725 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 7.

Data processing system 700 is an exemplary representation of one or more of the user device 104, external server 115, and one or more components of social networking system 130, or modules thereof (e.g., PLS module 129). Data processing system 700 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In one embodiment, data processing system 700 may be a network computer, server, or an embedded processing device within another device or consumer electronic product. As used herein, the terms computer, device, system, processing system, processing device, and "apparatus comprising a processing device" may be used interchangeably with data processing system 700 and include the above-listed exemplary embodiments.

Additional components, not shown, may also be part of data processing system 700, and, in one embodiment, fewer components than those shown in FIG. 7 may also be used in data processing system 700. It will be apparent from this description that aspects of the described embodiments may be embodied, at least in part, in software. That is, the processes of the embodiments described herein may be carried out in a computer system or other data processing system 700 in response to its processor or processing system 705 executing sequences of instructions contained in a memory, such as memory 710 or other non-transitory machine-readable storage medium. The software may further be transmitted or received over a network (not shown) via network interface device 715. In one embodiment, hardwired circuitry may be used in combination with the software instructions to implement the present embodiments. Thus, the techniques are not limited to any specific combination of hardware circuitry and software, or to any particular source for the instructions executed by data processing system 700.

An article of manufacture may be used to store program code providing at least some of the functionality of the embodiments described herein. Additionally, an article of manufacture may be used to store program code created using at least some of the functionality of the embodiments described herein. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments described herein may be implemented in, but not limited to, hardware or firmware utilizing an FPGA, ASIC, a processor, a computer, or a computer system including a network. Modules and components of hardware or software implementations can be divided or combined without significantly altering the embodiments described herein.

In the foregoing specification, embodiments of a PLS have been described with reference to specific exemplary embodiments thereof. Various aspects of the described embodiments are described with reference to details discussed herein, and the accompanying drawings illustrate the various embodiments. The description above and drawings are illustrative of the embodiments of a PLS and are not to be construed as limiting the embodiments of a PLS. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Blocks with dashed borders (e.g., large dashes, small dashes, dot-dash, dots) are used herein to illustrate optional operations that add additional features to embodiments of a PLS.

However, such notation should not be taken to mean that these are the only options or optional operations, and/or that blocks with solid borders are not optional in one embodiment of a PLS. Numerous specific details are described to provide a thorough understanding of various embodiments of a PLS. However, in certain instances, well-known or conventional details are not described in order to provide a concise discussion of embodiments described herein.

It will be evident that various modifications may be made thereto without departing from the broader spirit and scope of the embodiments of a PLS as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method, the method comprising:
   receiving a request from a first user of a communication system during a first period of time to share a content item with a plurality of second users of the communication system that are connected to the first user via a set relationship established in the communication system;
   creating a Privacy List Snapshot (PLS) for the first user, wherein the PLS includes the plurality of second users of the communication system that are connected to the first user via the set relationship during the first period of time;
   receiving, during a second period of time, a request from a third user to view content items, wherein the second period of time is subsequent to the first period of time;
   determining the third user became connected to the first user via the set relationship subsequent to the first period of time and subsequent to the creating of the PLS; and
   presenting content items for display to the third user, the content items displayed to the third user excluding the content item in response to determining the content item was shared by the first user in the first period of time associated with the PLS and in response determining that the third user is not in the PLS.

2. The computer-implemented method of claim 1, further comprising:
   presenting the first user with a first user interface that enables the first user to update the PLS based on one or more manual selections of users in addition to the plurality of second users included in the PLS.

3. The computer-implemented method of claim 1, wherein the PLS is created in response to receiving a user request to create the PLS.

4. The computer-implemented method of claim 1, wherein the PLS is created in response to an expiration of a threshold period of time.

5. The computer-implemented method of claim 1, wherein the PLS is created in response to detecting a user profile associated with the first user has changed.

6. The computer-implemented method of claim 5, wherein detecting the user profile has changed includes determining that the first user has left a school or started at a new school.

7. The computer-implemented method of claim 5, wherein detecting the user profile has changed includes determining that the first user has left a job or started at a new job.

8. The computer-implemented method of claim 1, further comprising:
   receiving a request from the first user to add the third user to the PLS; and
   updating the PLS to include the third user in response to the request to add the third user, wherein the content item is shared with the third user after adding the third user to the PLS.

9. The computer-implemented method of claim 1, wherein the PLS is created in response to determining a number of connections associated with the first user has changed by a threshold amount.

10. A non-transitory computer-readable medium storing instructions which, when executed by one or more processors in a processing device, cause the processing device to perform a method comprising:
    receiving a request from a first user of a communication system during a first period of time to share a content item with a plurality of second users of the communication system that are connected to the first user via a set relationship established in the communication system;
    creating a Privacy List Snapshot (PLS) for the first user, wherein the PLS includes the plurality of second users of the communication system that are connected to the first user via the set relationship during the first period of time;
    receiving, during a second period of time, a request from a third user to view content items, wherein the second period of time is subsequent to the first period of time;
    determining the third user became connected to the first user via the set relationship subsequent to the first period of time and subsequent to the creating of the PLS; and
    presenting content items for display to the third user, the content items displayed to the third user excluding the content item in response to determining the content item was shared by the first user in the first period of time associated with the PLS and in response determining that the third user is not in the PLS.

11. The non-transitory computer-readable medium of claim 10, further comprising:
    presenting the first user with a first user interface that enables the first user to update the PLS based on one or more manual selections of users in addition to the plurality of second users included in the PLS.

12. The non-transitory computer-readable medium of claim 10, wherein the PLS is created in response to receiving a user request to create the PLS.

13. The non-transitory computer-readable medium of claim 10, wherein the PLS is created in response to an expiration of a threshold period of time.

14. The non-transitory computer-readable medium of claim 10, wherein the PLS is created in response to detecting a user profile associated with the first user has changed.

15. The non-transitory computer-readable medium of claim 14, wherein detecting the user profile has changed includes determining that the first user has left a school or started at a new school.

16. The non-transitory computer-readable medium of claim 14, wherein detecting the user profile has changed includes determining that the first user has left a job or started at a new job.

17. The non-transitory computer-readable medium of claim 10, further comprising:
    receiving a request from the first user to add the third user to the PLS; and updating the PLS to include the third user in response to the request to add the third user, wherein the content item is shared with the third user after adding the third user to the PLS.

18. The non-transitory computer-readable medium of claim 10, wherein the PLS is created in response to determining a number of connections associated with the first user has changed by a threshold amount.

19. An apparatus comprising:
a processor;
a storage device coupled to the processor that is configured to store instructions, which when executed by the processor, cause the processor to:
receive a request from a first user of a communication system during a first period of time to share a content item with a plurality of second users of the communication system that are connected to the first user via a set relationship established in the communication system;
create a Privacy List Snapshot (PLS) for the first user, wherein the PLS includes the plurality of second users of the communication system that are connected to the first user via the set relationship during the first period of time;
receive, during a second period of time, a request from a third user to view content items, wherein the second period of time is subsequent to the first period of time;
determine the third user became connected to the first user via the set relationship subsequent to the first period of time and subsequent to the creating of the PLS; and
presenting content items for display to the third user, the content items displayed to the third user excluding the content item in response to determining the content item was shared by the first user in the first period of time associated with the PLS and in response to determining that the third user is not in the PLS.

20. The apparatus of claim 19, wherein the PLS is created in response to at least one of:
receiving a user request to create the PLS;
an expiration of a threshold period of time; or
detecting a user profile associated with the first user has changed.

* * * * *